US009395253B2

United States Patent
Ash et al.

(10) Patent No.: US 9,395,253 B2
(45) Date of Patent: Jul. 19, 2016

(54) RESISTANCE AND OFFSET CANCELLATION IN A REMOTE-JUNCTION TEMPERATURE SENSOR

(71) Applicant: Texas Instruments Incorporated, Dallas, TX (US)

(72) Inventors: Mikel K. Ash, Cedar Park, TX (US); Xiao Pu, Plano, TX (US); Joonsung Park, Dallas, TX (US); Krishnaswamy Nagaraj, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 515 days.

(21) Appl. No.: 13/931,799

(22) Filed: Jun. 28, 2013

(65) Prior Publication Data

US 2015/0003490 A1    Jan. 1, 2015

(51) Int. Cl.
*G01K 15/00* (2006.01)
*G01K 7/00* (2006.01)
*H03M 3/00* (2006.01)
*G01K 7/01* (2006.01)

(52) U.S. Cl.
CPC ............... *G01K 15/005* (2013.01); *G01K 7/01* (2013.01); *G01K 2219/00* (2013.01)

(58) Field of Classification Search
USPC ................. 374/170, 171, 178; 341/143
See application file for complete search history.

(56) References Cited

U.S. PATENT DOCUMENTS

| 7,410,293 | B1 * | 8/2008 | Santurkar | G01K 7/015 |
| | | | | 327/512 |
| 7,524,109 | B2 * | 4/2009 | Gardner | G01K 7/01 |
| | | | | 374/178 |
| 2008/0095213 | A1 * | 4/2008 | Lin | G01K 7/015 |
| | | | | 374/170 |
| 2009/0237283 | A1 * | 9/2009 | Tu | H03M 3/504 |
| | | | | 341/143 |

OTHER PUBLICATIONS

Hasnain Lakdawala et al, "A 1.05 V 1.6 mW, 0.45 C 3 Resolution Based Temperature Sensor with Parasitic Resistance Compensation in 32 nm Digital CMOS Process", IEEE Journal of Solid-State Circuits, vol. 44, No. 12, Dec. 2009, pp. 3621-3630.
Bonnie Baker, "How delta-Sigma ADCs Work, Part 1", Analog Applications Journal, High-Performance Analog Products, Texas Instruments Incorporate, 3rd Quarter, 2011, pp. 13-16.
Bernhard E. Boser and Bruce A. Wooley, "The Design of Sigma-Delta Modulation Analog-to-Digital Converters", IEEE Journal of Solid-State Circuits, vol. 23, No. 6, Dec. 1988, pp. 1298-1308.

* cited by examiner

*Primary Examiner* — Lisa Caputo
*Assistant Examiner* — Nasir U Ahmed
(74) *Attorney, Agent, or Firm* — John R. Pessetto; Frank D. Cimino (57) ABSTRACT

A temperature sensor uses a semiconductor device that has a known voltage drop characteristic that is proportional to absolute temperature (PTAT). A controllable current source is coupled to the semiconductor device and is operable to sequentially inject a bias current having a value I(bias) and fixed ratio N of I(bias) into the semiconductor device. A delta sigma analog to digital converter (ADC) has an input coupled to the semiconductor device. The delta sigma ADC is configured to sample and integrate a sequence of voltages pairs produced across the semiconductor device by repeatedly injecting an ordered sequence of selected bias currents into the semiconductor device. The ordered sequence of selected bias currents comprises M repetitions of (N×I(bias); I(bias)) and one repetition of (M×I(bias); M×N×I(bias)).

14 Claims, 5 Drawing Sheets

RESISTANCE AND OFFSET CANCELLATION IN A REMOTE-JUNCTION TEMPERATURE SENSOR

FIELD OF THE INVENTION

This invention generally relates to temperature sensing using a bipolar junction transistor.

BACKGROUND OF THE INVENTION

A bipolar junction transistor (BJT) is a type of transistor that relies on the contact of two types of semiconductor for its operation. BJTs may be used as amplifiers, switches, or in oscillators, for example. Charge flow in a BJT is due to bidirectional diffusion of charge carriers across a junction between two regions of different charge concentrations. The regions of a BJT are called emitter, collector, and base. A discrete transistor has three leads for connection to these regions. By design, most of the BJT collector current is due to the flow of charges injected from a high-concentration emitter into the base where there are minority carriers that diffuse toward the collector, and so BJTs are classified as minority-carrier devices.

Because of the known temperature and current dependence of the forward-biased base-emitter junction voltage (VBE), the BJT can be used to measure temperature by subtracting two VBE voltages at two different bias currents in a known ratio. The voltage difference (ΔVBE) is proportional to absolute temperature (PTAT) of the BJT device.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In a diode-based temperature sensor, precision bias currents with accurate ratios may be sequentially injected into a diode-connected BJT (bipolar junction transistor) and a net ΔVBE may then be measured by a high-resolution analog to digital converter (ADC). A temperature of the BJT device may then be calculated by a microprocessor coupled to the ADC, for example. In this manner, environmental temperature in the vicinity of the BJT may be determined. The BJT may be located adjacent the microprocessor and determine ambient temperature around the microprocessor, or the BJT may be located some distance away and therefore act as a remote temperature sensor, for example.

Because the accuracy of these temperature sensors relies on directly measuring the VBE of the transistor at different bias current levels, offsets due to series resistance and other sources in the signal path may add to the measurement and create an error term. Embodiments of the present invention provide an efficient method to correct for series resistance and other offset errors in a BJT temperature sensor.

Figure 1:
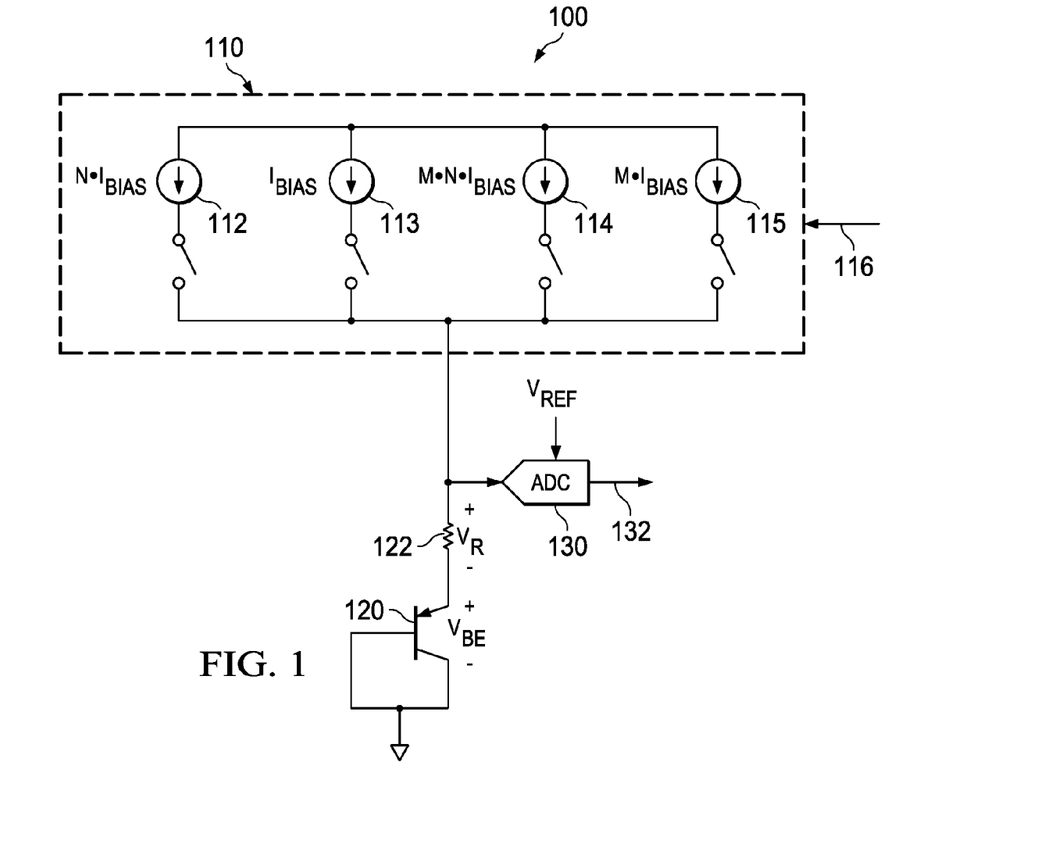
FIG. 1 is a schematic of a voltage measuring portion of an example temperature sensor.

FIG. 1 is a schematic of a voltage measuring portion 100 of an example temperature sensor. Current source 110 is controlled to send selected values of bias current through BJT 120. In this example, current source 110 includes four current sources 112-115 that are selectively enabled by switches controlled by control signal 116. The four current sources may be controlled to selectively inject a bias current having a value of I(bias), N*I(bias), M*I(bias) or M*N*I(bias) into BJT 120. In one embodiment, the value of M equals two. ADC 130 then samples a VBE across BJT 120 for each bias current value and forms a digital output that represents the ΔVBE produced by the selected bias current ratio provided by current source 110. In practice, there is always some amount of intrinsic series resistance in the BJT circuit, represented by resistor 122, due to wire and contact resistance through which the bias current flows. This intrinsic series resistance will in turn create an error signal VR that will decrease the accuracy of the ΔVBE measurement. Series resistance error may be more of a factor in a remote sensor application due to the distance between the BJT and the ADC and the resulting length of wire that is used to connect to the remote BJT.

A proven method to cancel the series resistance error in a temperature sensor involves sampling two sets of ΔVBE terms. Each ΔVBE term is derived from a pair of currents with a ratio of N. In addition, the pair of currents used to derive ΔVBE2 is scaled by a factor of two relative to the pair of currents used to derive ΔVBE1. Signal processing then proceeds by computing the expression given in equation (1). Equation (2) shows that as long as ΔVBE1 is approximately equal to ΔVBE2, the result of equation (1) will be valid. Fortunately, this relationship is true as long as the bias current ratio N remains the same for both ΔVBE measurements, as shown by equation (3), which expresses the known voltage/temperature relationship of BJT 120, where I(c1) and I(c2) are two different values of bias current.

$$V_{meas} = 2[\Delta V_{BE1} + (N-1)I_{BIAS}R] - [\Delta V_{BE2} + 2(N-1)I_{BIAS}R] = \Delta V_{BE} \quad (1)$$

$$\text{Input} = 2\Delta V_{BE1} - \Delta V_{BE2} \approx \Delta V_{BE} \quad (2)$$

$$\Delta V_{BE} = \frac{KT}{q} \cdot \ln\left(\frac{I_{C1}}{I_{C2}}\right) \quad (3)$$

Equation (1) states that if the second $\Delta VBE$ measurement is subtracted from twice the first $\Delta VBE$ measurement, the error terms related to the series resistance R is cancelled. An existing solution carries out this processing during the delta-sigma sampling by providing switching of the input to perform polarity reversal to derive the $\Delta VBE$ terms and difference in $\Delta VBE$ terms, and by using different gain scaling capacitors and switches during sampling to gain $\Delta VBE1$ by 2×. This is described in more detail in U.S. Pat. No. 7,524,109, which is incorporated by reference herein.

Embodiments of the present invention cancel the series resistance errors during the sampling process in a delta-sigma ADC without requiring additional gain scaling or reversal of the input polarity. By switching the injected currents and integrating the VBE terms in a certain sequence, a net $\Delta VBE$ result is derived with this error term canceled. Therefore, the final measurement output of the ADC is the desired $\Delta VBE$ that would be obtained if measuring directly across the base-emitter junction without series resistance error in the path. Additionally, a dummy calibration cycle may be used in some embodiments where a fixed current is injected into the BJT to measure a zero $\Delta VBE$ term that provides the offset error from all other sources in the signal path. This measured offset may then be subtracted from the net $\Delta VBE$ when performing the temperature calculations for the measured $\Delta VBE$.

Figure 2:
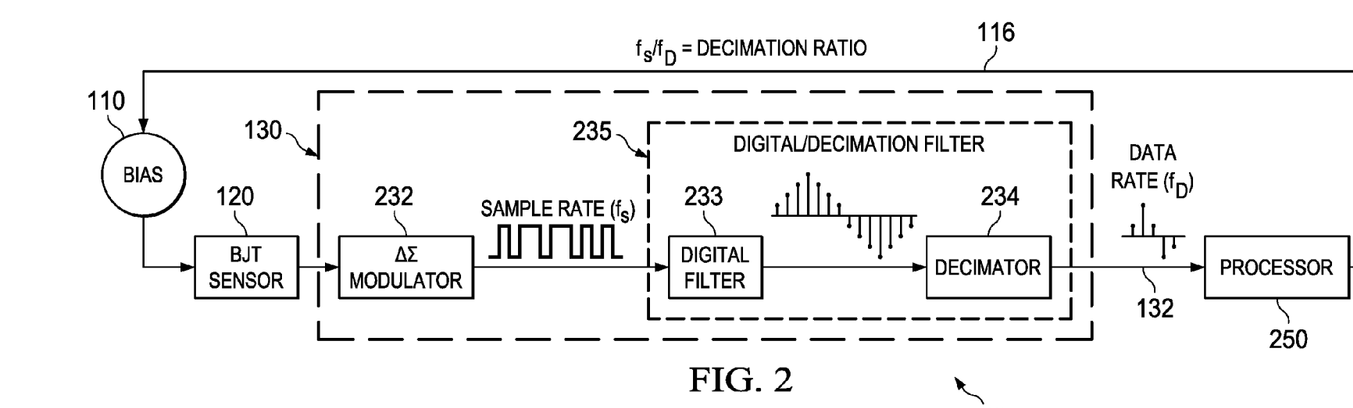
FIG. 2 is a block diagram of a complete temperature sensing system.

FIG. 2 is a block diagram of a complete temperature sensing system 200. As shown in FIG. 1, ADC 130 is coupled to BJT sensor 120 and is configured to measure VBE across BJT sensor 120 in response to a bias current injected into BJT 120 by controllable current source 110. Processor 250 receives the net $\Delta VBE$ digital values from output 132 and then converts the net $\Delta VBE$ voltage to a temperature using the known voltage/temperature relationship of BJT 120, as expressed by equation (3), where $I(c1)$ and $I(c2)$ are two different values of bias current.

Processor 250 may convert the corrected $\Delta VBE$ to temperature by calculating equation (3), or by using a pre-computed table of values in a look-up table, for example. In an embodiment that performs an offset calibration as described above, processor 250 may also subtract the stored offset value from the net $\Delta VBE$ value to further compensate the final temperature value. Processor 250 may be well known processors, such as: a microprocessor, a microcontroller, or a signal processor, for example. Processor 250 may include non-volatile memory for storing program code and memory for storing data, for example. Processor 250 may be part of a larger system, not shown, that in turn makes use of the temperature data provided by sensor 200, for example.

Processor 250 may also be configured to activate control signals 116 that control current source 110 and allow selection of various bias current values to be injected into BJT 110. Current source 110 may be four separate current sources, as illustrated in FIG. 1, or it may be a single adjustable current source, or some combination, for example. Regardless of how current source 110 is implemented, processor 250 may be operable to select a sequence of bias currents, as will be described in more detail below. In another embodiment, processor 250 may provide parameters to a programmable control circuit for current source 110, for example. In other embodiments, control of the current source 110 sequence may be performed in various manners, e.g.: a dedicated timing circuit, a state machine, a different control processor, etc., for example.

$\Delta\Sigma$ ADCs are useful for converting analog signals over a wide range of frequencies, from DC to several megahertz. Basically, these converters include an oversampling modulator followed by a digital/decimation filter that together produce a high-resolution data-stream output. The general operation of $\Delta\Sigma$ ADCs is well known, e.g. see: "The Design of Sigma-Delta Modulation Analog-to-Digital Converters," Bernard Boser and Bruce Wooley, 1988, which is incorporated by reference herein. The general operation of an $\Delta\Sigma$ ADC will now be described to aid in understanding the operation of embodiments of the invention.

The rudimentary delta sigma converter is a 1-bit sampling system. An analog signal applied to the input of the converter needs to be relatively slow so the converter can sample it multiple times, a technique known as oversampling. The sampling rate is typically hundreds of times faster than the digital results at the output ports. Each individual sample is accumulated over time and "averaged" with the other input-signal samples through the digital/decimation filter.

The $\Delta\Sigma$ converter's primary internal cells are the $\Delta\Sigma$ modulator 232 and the digital filter 233 and decimator 234. While Nyquist A/D converters have one sample rate, the $\Delta\Sigma$ converter has two—the input sampling rate (fS) and the output data rate (fD). The ratio of these two rates is the decimation ratio and defines the oversampling rate. $\Delta\Sigma$ modulator 232 coarsely samples the input signal at a very high fS rate into a 1-bit stream. Digital/decimation filter 235 then takes this sampled data and converts it into a high-resolution, slower fD rate digital code.

Figure 3:
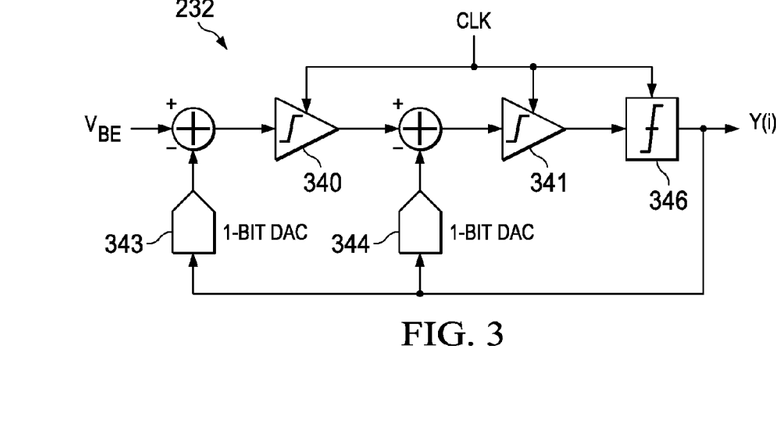
FIG. 3 is a block diagram that illustrates the operation of a delta sigma analog to digital converter in the system of FIG. 2.

FIG. 3 is a block diagram that illustrates the operation of $\Delta\Sigma$ modulator 232 in more detail. The $\Delta\Sigma$ modulator is the heart of the $\Delta\Sigma$ ADC. It is responsible for digitizing the analog input signal and reducing noise at lower frequencies. In this stage, the architecture implements a function called noise shaping that pushes low frequency noise up to higher frequencies where it is outside the band of interest. Noise shaping is one of the reasons that $\Delta\Sigma$ converters are well-suited for low-frequency, high accuracy measurements.

Typically, the input signal to a $\Delta\Sigma$ modulator is a time-varying analog voltage. In this case, it is the VBE values that are produced by the selected sequence of bias current, as will be described in more detail below. Modulator 232 converts the sequential analog input signal to a high-speed, single-bit, modulated pulse wave. $\Delta\Sigma$ modulator 232 acquires a sequence of samples of $\Delta VBE$ to produce a stream of 1-bit codes. The system clock implements the sampling speed, fS, in conjunction with the modulator's 1-bit comparator 346.

In this manner, the quantizing action of $\Delta\Sigma$ modulator 232 is produced at a high sample rate that is equal to that of the system clock. Like all quantizers, the $\Delta\Sigma$ modulator produces a stream of digital values Y(i) that represent the voltage of the input, in this case a 1-bit stream. As a result, the ratio of the number of ones to zeros represents the input analog voltage. Unlike most quantizers, $\Delta\Sigma$ modulator 232 includes a loop filter based on integrators 340, 341 which has the effect of shaping the quantization noise to higher frequencies. Consequently, the noise spectrum at the output of the modulator is not flat. Interestingly, the first-stage integrator 340 may also perform the function of executing equation (1) in an analog manner, as will be described below.

$\Delta\Sigma$ modulator 232 operates as a negative feedback loop by sensing the difference between the analog input voltage and a scaled version of the output produced by the 1-bit feedback digital-to-analog converters (DACs) 343, 344. This error voltage is presented to the loop filter, whose output progresses in a negative or positive direction to adjust the input to quantizer 346 as determined by the negative feedback loop. The output value of quantizer 346 is clocked back into the 1-bit DAC 343, 344 as well as clocked out to the digital filter stage 233, as signal Y(i). This time-domain output signal is a pulse-wave representation of the input signal at the sampling rate (fS).

Once the loop settles, the average value of the output pulse train equals the value of the input signal.

In the time domain, the 1-bit ADC 232 digitizes the ΔVbe signal to a coarse, 1-bit output code. The output Y(i) of modulator 232 is equal to the input plus the quantization noise, e(i)−e(i−1). As this formula shows, the quantization noise is the difference between the current quantization error (e(i)) and the previous quantization error (e(i−1)).

Figure 4:
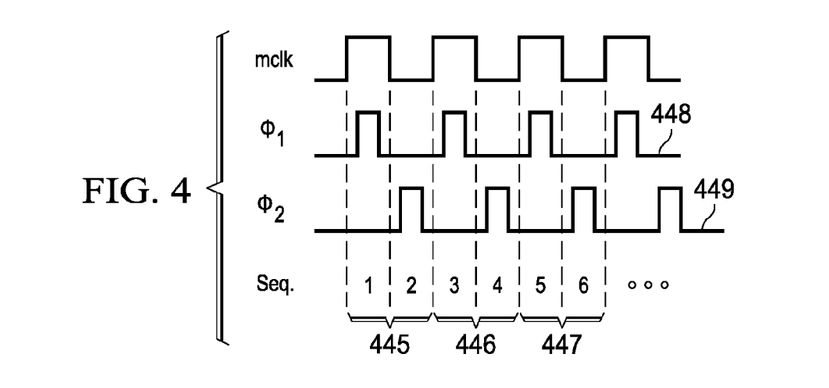
FIG. 4 is a timing diagram for controlling a sequence of bias currents for measuring ΔVBE.

FIG. 4 is a timing diagram for controlling a sequence of bias currents for measuring ΔVBE using a ΔΣ ADC with double sampling. Using a double sampling technique as indicated at 445-447 with a clever sequence of bias currents allows the ΔVBE terms to be derived and an overall series resistance corrected difference of ΔVBE terms to be derived without using input polarity reversal sampling. In embodiments of the invention, during each double sampling period, such as 445, a VBE value produced by one value of bias current is sampled during a sample phase in response to phase 1 clock signal 448 of the ΔΣ ADC and then another VBE value produced by a different value of bias current is sampled during an integration phase in response to phase 2 clock signal 449 of the ΔΣ ADC Table 1 lists the sequence of bias currents that are provided by current source 110, referring again to FIG. 1. In Table 1, N is given a value of 10 and I(bias) is 5 uA. During phase one of the first double sampling period 445, current source 112 is selected and injects 50 uA into BJT 120; a resulting VBEa is sampled by ADC 130 during its sampling phase. During phase two of the first sampling period 445, current source 113 is selected and injects 5 uA into BJT 120; a resulting VBEb is sampled by ADC during its integration phase. This same sequence is repeated in sequence positions 3 and 4 during double sampling period 446. If this is repeated for a large number of times, ADC 130 will produce a final value of VBEa−VBEb=ΔVBE1.

However, in sampling period 447 during phase one current source 114 is selected and injects 10 uA into BJT 120; a resulting VBEd is sampled by ADC 130 during its sampling phase. During phase two of the sampling period 447, current source 115 is selected and injects 100 uA into BJT 120; a resulting VBEc is sampled by ADC during its integration phase. Note that during sampling period 447, the magnitude of the bias currents is twice that of the prior sampling period and the order of the bias currents is reversed. If sampling period 447 is repeated for a large number of times, ADC 130 will produce a final value of VBEd−VBEc=−ΔVBE2.

TABLE 1

Bias current injection sequence for N = 10, I(bias) + 5 uA

| Sequence position. | First-Stage Integrator Action |
|---|---|
| 1 φ1 | Inject 50uA and sample VBEa |
| 2 φ2 | Inject 5 uA and integrate VBEa - VBEb → Vmeas = $\Delta V_{BE1}$ |
| 3 φ1 | Inject 50 uA and sample VBEa |
| 4 φ2 | Inject 5 uA and integrate VBEa - VBEb → Vmeas = 2 * $\Delta V_{BE1}$ |
| 5 φ1 | Inject 10 uA and sample VBEd |
| 6 φ2 | Inject 100 uA and integrate VBEc-VBEd → Vmeas = 2 * ΔVBE1 − ΔVBE2 |

Note:
Sequence #6 gives $-\Delta V_{BE2}$ due to order of current injections in sequences 5 and 6.

Therefore, after multiple repetitions of these three sampling periods 445-447, the final result is 2*ΔVBE1−ΔVBE2=ΔVBE. In this manner, the factor of 2× scaling of ΔVBE1 required by equation 1 is achieved by integrating two ΔVBE1 terms for every one ΔVBE2 term. This eliminates the need for different gain scaling capacitors and switches during the sampling process.

To compensate for the odd number of sample cycles introduced into the modulator for the effective 2× scaling of ΔVBE1, the digital decimation filter down samples by M−1 to achieve perfect cancellation of the series resistance during the digital processing.

In some embodiments, during an initial calibration process, a dummy cycle may be performed to determine a compensation factor that can then be used to cancel offset errors introduced by all other terms in the signal path. A fixed bias current is used during the sampling and integration process. In this case, VBE1=VBE2; therefore VBE1−VBE2=ΔVBE1=0. This produces a net zero ΔVBE measurement from the BJT diode, but will capture other static and dynamic offset terms that may affect this measurement and provides a compensation value. This measurement is then stored and may be used to digitally cancel this offset error from subsequent series-resistance cancelled ΔVBE measurements to give a final ΔVBE value with all sources of offset errors removed. This calibration step may be repeated periodically to compensate for offset changes caused by time or temperature, for example.

In this manner, a higher accuracy temperature measurement may be obtained by using more efficient signal processing. A lower area is required due to removal of additional gain scaling components and complex clock generation circuitry required to handle the series resistance cancellation mode of operation. Similarly, power consumption may be reduced due to a smaller load on first-stage integrator opamp and a lower sampling rate requirement. In one example, an area reduction of 18% with a power reduction of 70% was obtained.

Figure 5:
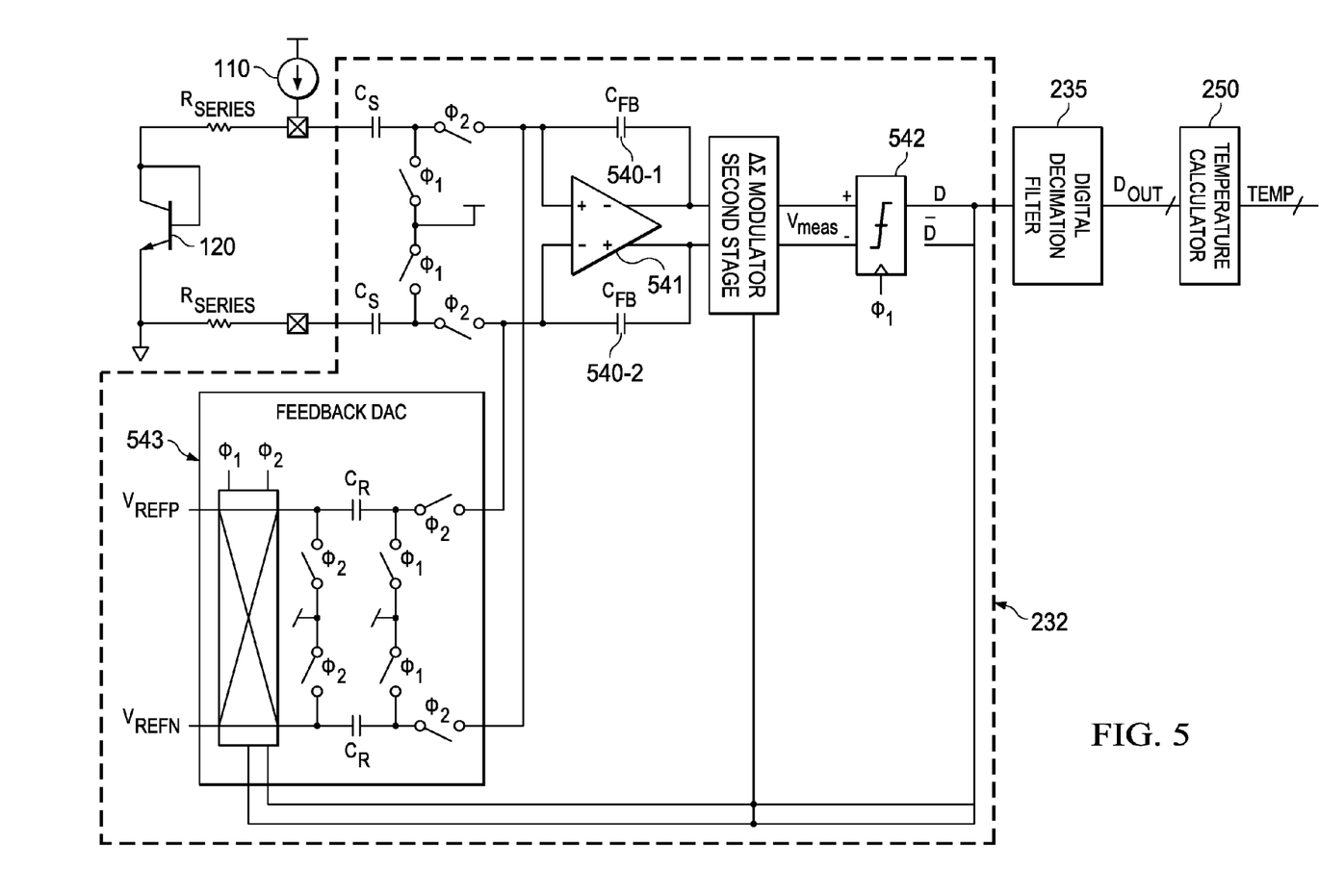
FIG. 5 is a more detailed schematic of the voltage measuring circuit of FIG. 1.

FIG. 5 is a more detailed schematic of ΔΣ modulator 232. The phase 1 and phase 2 clock signals 448, 449 control the various switches indicated by φ1 and φ2. While phase 1 clock signal 448 is active, programmable current source 110 injects a selected current into BJT 120 as described by Table 1 and a resulting voltage developed across BJT 120 and series resistance R(series) is sampled by sample capacitors Cs. While phase 2 clock signal 449 is active, programmable current source 110 injects a selected current into BJT 120 as described by Table 1 and a resulting voltage developed across BJT 120 and series resistance R(series) along with the voltage on sample capacitors Cs is coupled to amplifier 541. Feedback capacitors C(FB) cause the voltage stored on sample capacitors Cs and the voltage sampled by phase 2 clock 449 to be integrated. Comparator 542 then controls feedback DAC 543 as described above.

Figure 6:
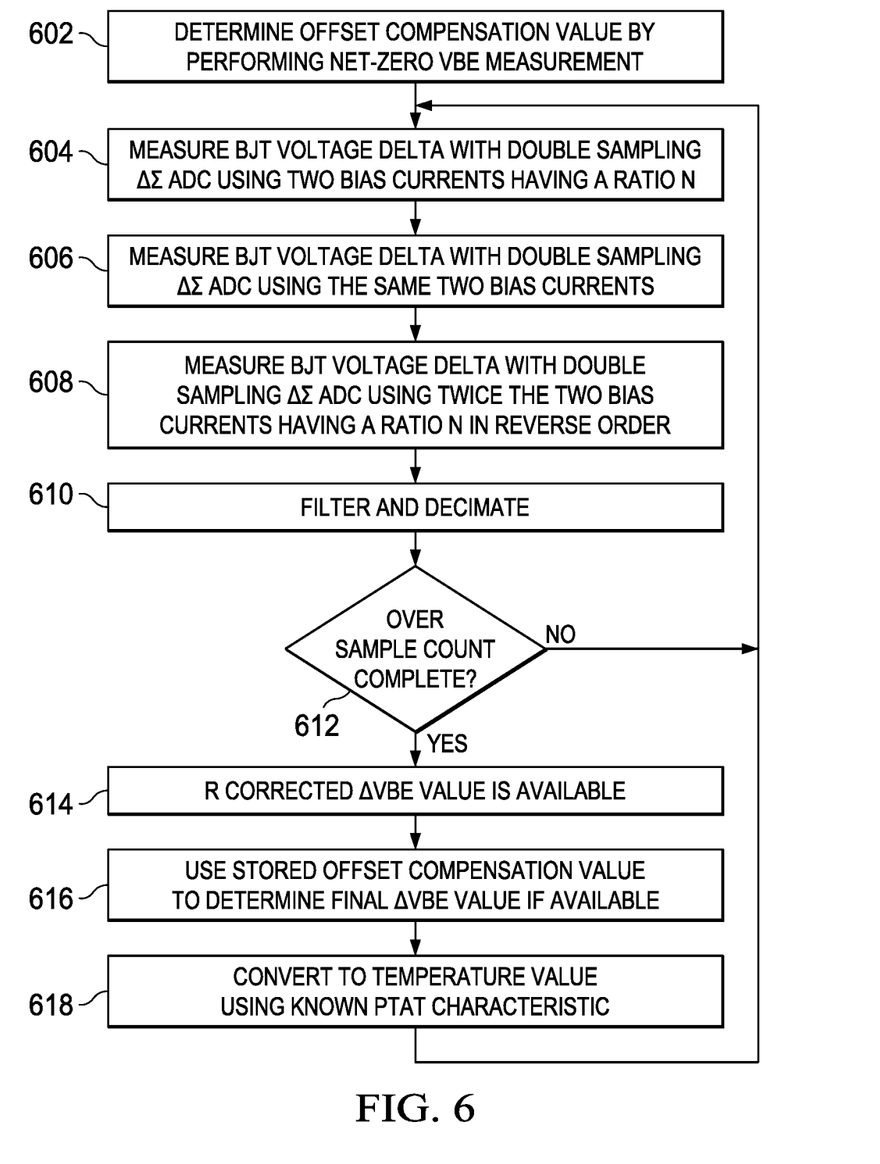
FIG. 6 is a flow chart illustrating a method for cancelling offset and series-resistance errors in a temperature sensor.

FIG. 6 is a flow chart illustrating a method for cancelling offset and series-resistance errors in a temperature sensor. In this example, N defines a ratio between a pair of bias currents used to produce a ΔVBE, and M defines a ratio between a first set of bias currents used to produce ΔVBE1 and a second set of bias currents used to produce ΔVBE2.

A first voltage delta (ΔVBE1) is measured across a semiconductor device having a known voltage drop characteristic that is proportional to absolute temperature (PTAT) by using a delta sigma analog to digital converter (ADC) with double sampling to measure a first voltage delta (across the semiconductor device produced by a ratio of current densities using a first bias current having a value of N×I(bias) and a second bias current having a value of I(bias), by repeatedly 604, 606 sampling the voltage drop produced by N×I(bias) during a sample phase of the ADC and sampling the voltage drop produced by I(bias) during an integration phase of the ADC.

A second voltage delta ($\Delta$VBE2) is measured 608 across the semiconductor device, produced by a third bias current having a value of M×I(bias) and by a fourth bias current having a value of M×N×(bias), by repeatedly sampling in reverse order the voltage drop produced by M×I(bias) during a sample phase of the ADC and sampling the voltage drop produced by M×N×I(bias) during an integration phase of the ADC.

A resistance corrected voltage delta is determined by sampling the first voltage delta M times more often than sampling the second voltage delta, while the reverse order of the currents used to establish the second voltage delta causes the second voltage delta to be subtracted from M times the first voltage delta resulting in a net $\Delta$VBE that is proportional to absolute temperature. In this manner, series resistance error is eliminated by performing equation (1) in an analog manner.

In this example, M equals two; therefore there are two sample periods 604, 606 for each sample period 608. In another embodiment, M could be three or four, for example, and the number of sample periods 604, 606 would be increased accordingly while the bias current in step 608 would similarly be increased by M.

As each measurement is taken, filtering and decimation 610 proceeds. After a sufficient number of samples have been taken 612 as defined by the decimation rate, the delta sigma ADC output converges to a steady value, assuming the temperature of the sensor has remained approximately constant. Typically, several tens or hundreds of repetitions may be performed to produce a steady output. At this point, a stable $\Delta$VBE that is corrected for series resistance error is available 614.

The corrected PTAT voltage delta may be converted 618 to a temperature value by using a known temperature-dependent voltage drop characteristic of the semiconductor device, as defined by equation (3), for example.

In some embodiments, there may be a calibration phase 602 in which a net offset voltage is obtained 602 from the ADC with double sampling by holding a bias current of the temperature sensor fixed during both the sample and integrate phase to capture a net-zero voltage delta measurement plus any residual offset component. After a complete sampling cycle, the filtered and decimated value of the residual net offset component is then stored for later use.

Each time a final R corrected $\Delta$VBE is available 614, it may then be further corrected by subtracting 616 the stored residual offset value to form a final $\Delta$VBE value that is then converted 618 to a temperature value.

System Example

Figure 7:
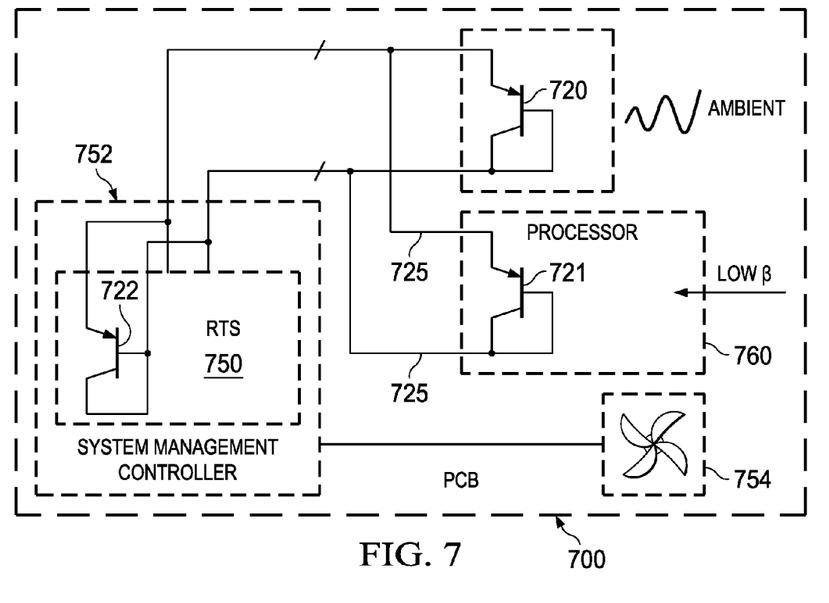
FIG. 7 is an example system that contains a temperature sensor.

FIG. 7 is an example system 700 that contains a temperature sensing system 750. In this example, a high power processor 760 has a heat sink attached to it to dissipate power. A fan 754 is mounted adjacent the heat sink and is controlled by system management controller (SMC) 752 to spin faster when the temperature of processor 760 increases. Remote sensing BJT 720, 721 are configured to measure ambient temperature and the temperature of processor 760, respectively. BJT 722 is configured to measure internal temperature of the SMC device 752. Due to the length of wires 725 that connect BJTs 720, 721 to temperature sensing system 750, there may be a significant resistance offset error that is corrected by temperature sensing system 750 that uses an ordered sequence of bias currents and controlled sampling rates as described above in more detail to produce corrected temperature measurements.

Other Embodiments

While the invention has been described with reference to illustrative embodiments, this description is not intended to be construed in a limiting sense. Various other embodiments of the invention will be apparent to persons skilled in the art upon reference to this description. For example, while the example illustrated herein samples $\Delta$VBE1 twice and then samples $\Delta$VBE2 once using a bias current value of 2× to produce 2*$\Delta$VBE1−$\Delta$VBE2=$\Delta$VBE, other embodiments may use a different sampling ratio. For example, a sampling ratio of three may be used in which $\Delta$VBE1 is sampled three time for each sample of $\Delta$VBE2 that uses a bias current value of 3× to produce 3*$\Delta$VBE1−$\Delta$VBE2=2*$\Delta$VBE. The 2× scaling factor in this result can be taken into account in the digital processing prior to calculating the final temperature reading.

Embodiments of the temperature sensor and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized accelerators. A stored program in an onboard or external (flash EEP) ROM or FRAM may be used to implement aspects of the temperature sensor digital processing.

Embodiments of the temperature sensor and methods described herein may be used in all manner of applications, e.g.: various monitoring and process control systems in manufacturing, transportation, and business applications; electronic thermostats and heating and air conditioning control systems; thermometers; fixed and mobile computing system, personal digital assistants such as tablets, pads or smart phones; etc, for example.

A portion of the techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for cancelling series-resistance errors in a temperature sensor, the method comprising:

measuring a first voltage delta across a semiconductor device having a known voltage drop characteristic that is proportional to absolute temperature (PTAT) by using a delta sigma analog to digital converter (ADC) with double sampling to measure the first voltage delta across the semiconductor device produced by a ratio of current densities using a first bias current having a value of N×I(bias) and a second bias current having a value of I(bias), by repeatedly sampling the voltage drop produced by N×I(bias) during a sample phase of the ADC and sampling the voltage drop produced by I(bias) during an integration phase of the ADC;

measuring a second voltage delta across the semiconductor device, produced by a third bias current having a value of M×I(bias) and by a fourth bias current having a value of M×N×I(bias), by repeatedly sampling in reverse order the voltage drop produced by M×I(bias) during a sample phase of the ADC and sampling the voltage drop produced by M×N×I(bias) during an integration phase of the ADC;

determining a corrected voltage delta by sampling the first voltage delta M times more often than sampling the second voltage delta, such that the reverse order of the currents used to establish the second voltage delta causes the second voltage delta to be subtracted from M times the first voltage delta resulting in a net voltage delta that is proportional to absolute temperature; and converting the corrected PTAT voltage delta to a temperature value by using a known temperature-dependent voltage drop characteristic of the semiconductor device.

2. The method of claim 1, wherein N is ten and M is two.

3. The method of claim 1, wherein the semiconductor device is a bipolar junction device and the voltage delta is the voltage potential difference between two base-emitter voltages generated from two current densities with a fixed ratio of N.

4. The method of claim 1, further comprising:

storing a net voltage offset obtained by the delta sigma ADC with double sampling by holding a bias current of the temperature sensor fixed during both the sampling and integration phases of an offset measurement period to determine a net voltage delta that includes any residual offset component; and eliminating an offset error by subtracting the stored net voltage offset value from the corrected PTAT voltage delta prior to converting to a temperature value.

5. A temperature sensor comprising:

a semiconductor device having a known voltage drop characteristic that is proportional to absolute temperature (PTAT);

a controllable current source coupled to the semiconductor device, wherein the controllable current source is operable to sequentially inject a bias current having a value I(bias) and fixed ratio N of I(bias) into the semiconductor device; and a delta sigma analog to digital converter (ADC) having an input coupled to the semiconductor device, wherein the delta sigma ADC is configured to sample and integrate a sequence of voltages pairs produced across the semiconductor device by repeatedly injecting an ordered sequence of selected bias currents into the semiconductor device, wherein the ordered sequence of selected bias currents comprises: M repetitions of (N×I(bias); I(bias)); and one repetition of (M×I(bias); M×N×I(bias)).

6. The sensor of claim 5, wherein N is ten and M is two.

7. The sensor of claim 5, further comprising control circuitry coupled to the controllable current source to produce the ordered sequence of selected bias currents.

8. The sensor of claim 5, further comprising conversion logic coupled to receive a corrected PTAT voltage delta drop measured by the ADC and operable to convert the corrected PTAT voltage delta drop into a temperature by using the known temperature-dependent voltage drop characteristic of the semiconductor device.

9. The sensor of claim 5, wherein the semiconductor device is a bipolar junction device and the voltage delta is the voltage potential difference between two base-emitter voltages generated from two current densities with a fixed ratio of N.

10. The sensor of claim 5, further comprising calibration logic configured to store a net voltage offset obtained by the delta sigma ADC with double sampling by holding a bias current of the temperature sensor fixed during both the sampling and integration phases of an offset measurement period to determine a net voltage delta that includes any residual offset component; and correction logic configured to eliminate an offset error by subtracting the stored net voltage offset value from the corrected PTAT voltage delta prior to converting to a temperature value.

11. A temperature sensor comprising:

means for measuring a first voltage delta across a semiconductor device having a known voltage drop characteristic that is proportional to absolute temperature (PTAT) by using a delta sigma analog to digital converter (ADC) with double sampling to measure the first voltage delta across the semiconductor device produced by a ratio of current densities using a first bias current having a value of N×I(bias) and a second bias current having a value of I(bias), by repeatedly sampling the voltage drop produced by N×I(bias) during a sample phase of the ADC and sampling the voltage drop produced by I(bias) during an integration phase of the ADC;

means for measuring a second voltage delta across the semiconductor device, produced by a third bias current having a value of M×I(bias) and by a fourth bias current having a value of M×N×I(bias), by repeatedly sampling in reverse order the voltage drop produced by M×I(bias) during a sample phase of the ADC and sampling the voltage drop produced by M×N×I(bias) during an integration phase of the ADC;

means for determining a corrected voltage delta by sampling the first voltage delta M times more often than sampling the second voltage delta, such that the reverse order of the currents used to establish the second voltage delta causes the second voltage delta to be subtracted from M times the first voltage delta resulting in a net voltage delta that is proportional to absolute temperature; and means for converting the corrected PTAT voltage delta to a temperature value by using a known temperature-dependent voltage drop characteristic of the semiconductor device.

12. The sensor of claim 11, wherein N is ten and M is two.

13. The sensor of claim 11, wherein the semiconductor device is a bipolar junction device and the voltage delta is the voltage potential difference between two base-emitter voltages generated from two current densities with a fixed ratio of N.

14. The sensor of claim 11, further comprising:

means for storing a net voltage offset obtained by the delta sigma ADC with double sampling by holding a bias current of the temperature sensor fixed during both the sampling and integration phases of an offset measurement period to determine a net voltage delta that includes any residual offset component; and means for eliminating an offset error by subtracting the stored net voltage offset value from the corrected PTAT voltage delta prior to converting to a temperature value.

* * * * *